United States Patent
Maiti et al.

(10) Patent No.: US 10,683,211 B2
(45) Date of Patent: Jun. 16, 2020

(54) PROCESS FOR POTASH RECOVERY FROM BIOMETHANATED SPENT WASH WITH CONCOMITANT ENVIRONMENTAL REMEDIATION OF EFFLUENT

(71) Applicant: COUNCIL OF SCIENTIFIC & INDUSTRIAL RESEARCH, New Delhi (IN)

(72) Inventors: Pratyush Maiti, Gujrat (IN); Subarna Maiti, Gujrat (IN); Soumya Haldar, Gujat (IN); Krishna Kanta Ghara, Gujrat (IN); Prasanta Das, Gujrat (IN); Samir Kumar Kanjibhai Charola, Gujrat (IN); Neha Pratap Patel, Gujrat (IN)

(73) Assignee: COUNCIL OF SCIENTIFIC & INDUSTRIAL RESEARCH (IN)

( * ) Notice: Subject to any disclaimer, the term of this patent is extended or adjusted under 35 U.S.C. 154(b) by 174 days.

(21) Appl. No.: 15/758,468

(22) PCT Filed: Sep. 8, 2016

(86) PCT No.: PCT/IN2016/050298
§ 371 (c)(1),
(2) Date: Mar. 8, 2018

(87) PCT Pub. No.: WO2017/042832
PCT Pub. Date: Mar. 16, 2017

(65) Prior Publication Data
US 2018/0257945 A1 Sep. 13, 2018

(30) Foreign Application Priority Data
Sep. 10, 2015 (IN) .......................... 2836/DEL/2015

(51) Int. Cl.
C01D 9/04 (2006.01)
C05C 5/02 (2006.01)
(Continued)

(52) U.S. Cl.
CPC ................. *C01D 9/04* (2013.01); *C01D 9/00* (2013.01); *C05C 5/02* (2013.01); *C05D 3/02* (2013.01);
(Continued)

(58) Field of Classification Search
CPC ... C01D 9/04; C01D 9/00; C05D 5/00; C05D 3/02; C05F 5/008; C05C 5/02; Y02A 40/212; Y02E 50/343; Y02W 30/47
See application file for complete search history.

(56) References Cited

U.S. PATENT DOCUMENTS 1,400,192 A 12/1921 Whitaker
3,069,230 A 2/1962 Pescarolo et al.
(Continued)

FOREIGN PATENT DOCUMENTS

CN 101 830 734 A 9/2010
CN 101 781 138 B 7/2012
(Continued)

OTHER PUBLICATIONS

Ghara et al., "Production of pure potassium salts directly from sea bittern employing tartaric acid as a benign and recyclable K+ precipitant", RSC Adv., 2014,4, 34706-34711, Published online Aug. 12, 2014. (Year: 2014).*
(Continued)

*Primary Examiner* — Anthony J Zimmer
(74) *Attorney, Agent, or Firm* — Belles Katz LLC

(57) ABSTRACT

Molasses based alcohol distilleries generate highly contaminated, dark coloured and foul smelling effluent (bio-methanated spent wash, BMSW, also known as post methanated
(Continued)

effluent). While the prevailing practices for treatment of alcohol distillery effluents operate on the premises of "liability management", high potassium content of spent wash (ca. 2% w/v in BMSW) offers an opportunity for its utilisation in production of potash fertilizers—a major agricultural input. The present invention provides process for potash recovery from BMSW with concomitant environmental remediation of effluent. The process involves pre-treatment of BMSW followed by potash recovery through selective precipitation technique to produce potash fertilizers and activated carbon while generating a relatively benign effluent (>80% remediation). It may further be possible for the alcohol distilleries to achieve ZLD status by incorporating commercially practiced water recovery techniques (viz., multiple effect evaporation/nano-filtration/reverse osmosis etc.) for downstream processing of the process effluent.

7 Claims, 1 Drawing Sheet

(51) Int. Cl.
    C05D 3/02      (2006.01)
    C01D 9/00      (2006.01)
    C05F 5/00      (2006.01)
    C05D 5/00      (2006.01)
(52) U.S. Cl.
    CPC ............... *C05D 5/00* (2013.01); *C05F 5/008* (2013.01); *Y02A 40/212* (2018.01); *Y02E 50/343* (2013.01); *Y02W 30/47* (2015.05)

(56) References Cited

U.S. PATENT DOCUMENTS

| | | | | |
|---|---|---|---|---|
| 4,358,537 | A | * 11/1982 | Chynoweth | C12P 5/00 435/161 |
| 5,635,393 | A | * 6/1997 | Bhatnagar | C02F 3/2846 435/262 |
| 2004/0025715 | A1 | * 2/2004 | Bonde | A01C 3/00 99/485 |
| 2007/0122874 | A1 | * 5/2007 | Suthanthararajan | C02F 3/286 435/41 |
| 2010/0093049 | A1 | * 4/2010 | Datta | B01D 53/84 435/167 |
| 2012/0073199 | A1 | * 3/2012 | Lewis | C10B 53/02 48/127.5 |
| 2013/0137153 | A1 | * 5/2013 | Elbeshbishy | C12P 3/00 435/168 |
| 2013/0260433 | A1 | * 10/2013 | Zhang | C02F 3/286 435/167 |
| 2016/0186218 | A1 | * 6/2016 | Hafez | C12F 3/02 435/42 |
| 2018/0230065 | A1 | * 8/2018 | Maiti | C01C 1/24 |

FOREIGN PATENT DOCUMENTS

EP        2 751 028 B1    12/2015
WO    WO 2013/150363 A1   10/2013

OTHER PUBLICATIONS

International Search Report issued in Indian Application No. PCT/IN2016/050298 dated Feb. 21, 2017.
Indian Standard, "Guide for Treatment of Distilllery Effluents", Bureau of Indian Standards, Manak Bhavan, 9 Bahadur Shah Zafar Marg, New Delhi, IN 110002, Aug. 1976. IN.

* cited by examiner

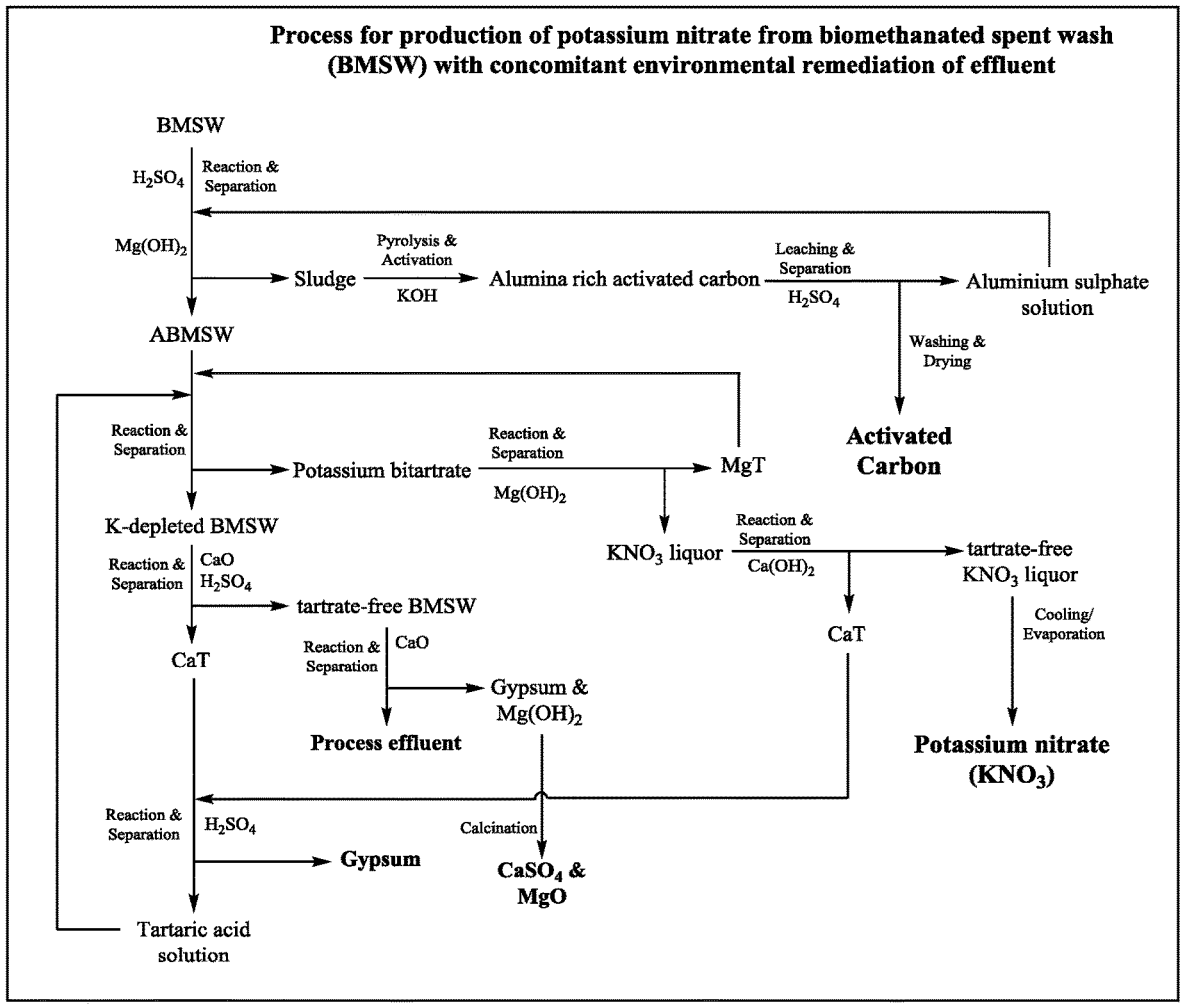

PROCESS FOR POTASH RECOVERY FROM BIOMETHANATED SPENT WASH WITH CONCOMITANT ENVIRONMENTAL REMEDIATION OF EFFLUENT

FIELD OF THE INVENTION

The present invention provides process for potash recovery from bio-methanated spent wash (BMSW, also known as post methanated effluent), generated in molasses based alcohol distillery, with concomitant environmental remediation (in terms of colour, total dissolved solids (TDS), total organic carbon (TOC), biological oxygen demand (BOD), chemical oxygen demand (COD) etc.). In a broader perspective this invention enables utilisation of indigenous potassic resource while addressing critical environmental concerns.

BACKGROUND OF THE INVENTION

Molasses based alcohol distillery effluent is an extremely complex system and poses significant challenge in developing effective environmental remediation protocol. While use of this effluent in land application, to take advantage of nutrient value of constituent K, N and P have been reported in the literature and put in practice, effort have also been made to recover potassium from the effluent.

Reference may be made to U.S. Pat. No. 1,400,192, dated Dec. 13, 1921 by Whitaker M. C. which teaches about a process for precipitating potassium from distillery waste by using hexafluorosilicic acid as precipitant. However, use of hexafluorosilicic acid will lead to fluoride contamination in effluent stream necessitating additional input for environmental management of the effluent.

Reference may be made to section 5.1.6.3 of Indian Standard IS: 8032-1976 (reaffirmed 2003) "GUIDE FOR TREATMENT OF DISTILLERY EFFLUENTS", which teaches about process for the recovery of potash from distillery spent wash. The process involves neutralization of spent wash followed by concentration and incineration to produce "spent wash coke" which on combustion produces ash. This ash is then leached with water. The leachate upon neutralisation with sulphuric acid and subsequent crystallization yields solid mixture of potassium sulphate and potassium chloride. However, this mixed salt is contaminated with ca. 5% sodium salts and may not meet the prevailing standards for use as fertiliser. Additionally, due to high probability of organic fouling and slag formation, evaporation and incineration performance is likely to be compromised on prolonged operation.

Reference may be made to Chinese patent no. 101781138 B dated Jul. 4, 2012 by Chen Y. et al. wherein potassium is selectively recovered from molasses based alcohol distillery waste through ion exchange process using ammonium modified natural zeolite. Subsequently the ion exchange column was eluted with solution of ammonium salt (viz., nitrate/sulphate chloride etc.) to release potassium is aqueous solution of corresponding ammonium salt solution. This solution is then concentrated to produce solid K—N fertiliser. However, in this process, during ion exchange ammonia is continually lost in K-depleted distillery waste, which will adversely affect process economics as well as quality of process effluent.

Reference may be made to European patent no. 2751028 dated Dec. 9, 2015 by Maiti P. et al. which teaches about a method for selectively precipitating potassium from aqueous solution, e.g., schoenite end liquor, using tartaric acid as precipitant. However, due to interaction of constituent solutes, particularly organics, straightforward implementation of this process results in lower K recovery and highly coloured and impure potash salt. Thus a need was felt to devise a safe and sustainable process for production of potassium salts of acceptable quality from alcohol distillery waste.

OBJECTS OF THE INVENTION

The main object of the invention is to devise a process for potash recovery from alcohol distillery waste with concomitant improvement of process effluent quality.

Another object of the invention is to use BMSW (also known as post methanated effluent) as feedstock for production of potash fertiliser.

Another object of the invention is to recover potassium from BMSW, to produce multi-nutrient potassic fertilizers viz., potassium nitrate, potassium sulphate, mono potassium phosphate etc.

Another object of the invention is to improve process effluent quality vis-à-vis alcohol distillery waste in terms of various environmental parameters, viz., odour, colour, TDS, TOC, BOD, COD etc.

Another object of the invention is to utilise solid waste for preparation of value-added by-products.

BRIEF DESCRIPTION OF THE DRAWING

FIG. 1 represents scheme of the process for production of potassium nitrate from biomethanated spent wash (BMSW) with concomitant environmental remediation of effluent.

SUMMARY OF THE INVENTION

The present invention provides a process for recovery of potassium from BMSW with concomitant improvement of process effluent quality.
The process comprises following major steps:
(i) acid treatment of BMSW to generate carbon-rich sludge;
(ii) clarification of slurry from step (i), through in-situ formation of aluminium hydroxide gel to effect removal of fine particulates, preferably in multiple stages;
(iii) precipitation of potassium bitartrate, by reacting the supernatant liquid from step (ii) with partially (ca. 50%) protonated magnesium tartrate, following the general procedures as disclosed in prior art;
(iv) recovery of residual tartrate as calcium tartrate, by treating the supernatant liquid from step (iii) with calcium oxide & hydrochloric acid/sulphuric acid;
(v) co-precipitation of gypsum & magnesium hydroxide, by treating the supernatant liquid from step (iv) with calcium oxide;
(vi) discharge of the supernatant liquid from step (v) as process effluent for subsequent environmental remediation/water recovery;
(vii) decomposition of absorbed organics, by calcining the gypsum & magnesium hydroxide cake from step (v);
(viii) production of potassium nitrate liquor, by reacting the potassium bitartrate [from step (iii)] with nitric acid and magnesium hydroxide, following the general procedures as disclosed in prior art;
(ix) removal of residual tartrate, by treating the potassium nitrate liquor [from step (viii)] with calcium oxide & nitric acid;

(x) crystallisation of potassium nitrate (purity >99%), by cooling/evaporating the potassium nitrate liquor [from step (ix)];

(xi) regeneration of tartaric acid, by treating the calcium tartrate [from step (iv) & step (ix)] with sulphuric acid, and subsequent reuse in step (iii) above, following the general procedures as disclosed in prior art;

(xii) production of alumina rich activated carbon, by pyrolysing and activating the sludge from step (ii);

(xiii) generating aluminium sulphate solution, by leaching the alumina rich activated carbon obtained in step (xii) with sulphuric acid, and recycling the same in step (ii), for in-situ formation of aluminium hydroxide gel (xiv) production of activated carbon through washing and drying the solid carbon obtained in step (xiii)

FEATURES OF THE INVENTION (1) The main feature is development of a process for recovery of potassium from BMSW with concomitant improvement of process effluent quality (in terms of odour, colour, TDS, TOC, COD, BOD etc.).

(2) Another feature of the invention is removal of majority of soluble organics and volatiles from BMSW, prior to effecting potash recovery.

(3) Another feature of the invention is in-situ formation of aluminum hydroxide gel in acid treated BMSW to aid clarification of liquid phase.

(4) Another feature of the invention is to improve process effluent quality (viz., colour, TDS, TOC, BOD, COD etc.) by co-precipitating gypsum & magnesium hydroxide from tartrate-free BMSW.

(5) Another feature of the invention is to minimize process solid waste by utilising the sludge, obtained in course of acid treatment and subsequent clarification of BMSW, for production of activated carbon;

(6) Another feature of the invention is to reduce raw material consumption by recycling aluminium sulphate solution, obtained upon leaching of alumina rich activated carbon.

DETAIL DESCRIPTION OF THE INVENTION

The present invention provides a process for recovery of potassium from BMSW with concomitant improvement of process effluent quality, such process comprising (i) Addition of sulphuric acid into BMSW (containing ca. 2% $K^+$ w/v), under stirring, till pH is ca. 1.5;

(ii) addition of aluminium sulphate solution to the slurry from step (i) under stirring, to maintain $Al^{3+}$ concentration between 0.05%-0.5% (w/v), followed by addition of magnesium hydroxide to the reaction mixture to adjust pH between 5.5-7.5;

(iii) precipitation of potassium bitartrate, by reacting the supernatant liquid from step (ii) with partially (ca. 50%) protonated magnesium tartrate, following the general procedures as disclosed in prior art;

(iv) precipitation of residual tartrate as calcium tartrate, by treating the supernatant liquid from step (iii) with calcium oxide & sulphuric acid;

(v) co-precipitation of gypsum & magnesium hydroxide, by treating the supernatant liquid from step (iv) with calcium oxide;

(vi) discharge of the supernatant liquid from step (v) as process effluent for subsequent environmental remediation/water recovery;

(vii) decomposition of absorbed organics, by calcining the gypsum & magnesium hydroxide cake from step (v);

(viii) production of potassium nitrate, by reacting the potassium bitartrate [solid obtained from step (iii)] with nitric acid and magnesium hydroxide/magnesium carbonate, following the general procedures as disclosed in prior art;

(ix) regeneration of tartaric acid, by treating precipitated calcium tartrate with sulphuric acid, and subsequent reuse in step (iii) above, following the general procedures as disclosed in prior art;

(x) production of alumina rich activated carbon, by thermo-chemical processing of the sludge from step (ii);

(xi) production of aluminium sulphate solution by leaching and washing the alumina rich activated carbon from step (x) with sulphuric acid and recycling the same in step (ii), for in-situ formation of aluminium hydroxide gel;

(xii) production of activated carbon by washing and drying the solid residue from step (xi).

In another embodiment, acid treatment of BMSW resulted in over 50% reduction of TOC in aqueous phase.

In another embodiment, hydrochloric acid and nitric acid were used in lieu of sulphuric acid, for acid treatment of BMSW.

In another embodiment, in-situ precipitation of aluminium hydroxide gel resulted in reduction in TOC of acid treated BMSW.

In another embodiment, co-precipitation of gypsum and magnesium hydroxide from tartrate free BMSW resulted in reduction of pollutant loading (expressed in terms of TDS, TOC, BOD, COD etc.) in process effluent.

In another embodiment, sludge obtained upon acid treatment and clarification of BMSW was thermo-chemically processed to prepare activated carbon.

The following examples are given by way of illustration of the novel and inventive steps and therefore should not be construed to limit the scope of the present invention.

Example-1

Concentrated (36 N) sulphuric acid was slowly added into 1 L BMSW ($K^+$: 1.89%; $Na^+$: 0.15%; $Mg^{2+}$: 0.22%; $Ca^{2+}$: 0.06%; pH: 7.7, TOC: 95,125 mg/L; BOD: 12,195 mg/L; COD: 64,502 mg/L), under stirring to adjust pH of the reaction mixture at 1.5. Stirring was continued for 2 h. The entire reaction was carried out under ambient temperature (28±3° C.), without any heating/cooling arrangement. The resultant slurry was centrifuged to obtain 0.86 L supernatant liquid [acidified BMSW (ABMSW), TOC: 44,000 mg/L]. The sludge was dried to constant weight at 100° C. to obtain 15.5 g of dry solid (C: 36.41%, H: 4.11%, N: 5.36%. S: 5.96%, w/w; gross calorific value: 13.8 MJ/kg).

Example 1 teaches us the method to reduce organic loading in aqueous phase through acid treatment of BMSW.

Example-2

Example-1 was repeated using concentrated (12 N) hydrochloric acid in lieu of sulphuric acid to maintain pH of final reaction mixture at 1.5. On separation of the resultant slurry, 0.9 L ABMSW and 16.2 gm dried sludge was obtained.

Example-3

Example-1 was repeated using concentrated (16 N) nitric acid in lieu of sulphuric acid to maintain pH of final reaction mixture at 1.5. On separation of the resultant slurry, 0.9 L ABMSW and 15.6 gm dried sludge was obtained.

Example 2 & 3 teach us that both hydrochloric acid and nitric acid perform in similar manner for acid treatment of BMSW.

Example-4

50 mL BMSW ($K^+$: 1.89%; pH: 7.7, TOC: 36,000 mg/L) was treated with concentrated sulphuric acid following the procedures elaborated in example-1, to obtain 45 mL ABMSW, which was subsequently neutralized using magnesium hydroxide to obtain treated BMSW (pH: 7.2, TOC: 26070 mg/L).

Example-5

Concentrated sulphuric acid was slowly added into 50 mL BMSW of example-4 till pH of reaction mixture reaches 1.5. Aluminium sulphate crystals were added to the reaction mixture to maintain 0.3% (w/v) $Al^{3+}$ concentration. The resultant reaction mixture was neutralized using magnesium hydroxide. Stirring was continued throughout the reaction. The slurry was centrifuged to obtain treated and clarified BMSW (pH: 7.1, TOC: 24,370 mg/L).

Example 4 & 5 teach us that in-situ formation of aluminium hydroxide gel reduces organic carbon load in aqueous phase.

Example-6

5 sets of treated and clarified BMSW was prepared, using the BMSW of example-4 and following the procedure of example-5, varying $Al^{3+}$ concentration from 0.1%-0.3% (w/v). Light absorbance, over 380-800 nm wavelength range, of these 5 samples (designated by their respective $Al^{3+}$ concentration), and BMSW was measured. Following table illustrates % reduction in light absorbance of the treated and clarified samples vis-à-vis BMSW.

| Sample code | Reduction in light absorbance (%) vis-à-vis BMSW | | | |
| --- | --- | --- | --- | --- |
| | At 400 nm | At 500 nm | At 600 nm | At 700 nm |
| Al = 0.1% | 57.73% | 66.96% | 72.05% | 75.98% |
| Al = 0.15% | 73.26% | 80.33% | 84.51% | 86.23% |
| Al = 0.2% | 82.59% | 87.91% | 91.08% | 92.41% |
| Al = 0.25% | 86.72% | 91.32% | 94.14% | 95.64% |
| Al = 0.3% | 86.78% | 90.68% | 93.23% | 94.93% |

Example 6 teaches us that by increasing the quantity of in-situ formation of aluminium hydroxide gel higher degree of reduction in light absorbance of aqueous phase, across the visible light spectrum (i.e., 400-700 nm) can be achieved. In other words, example 6 demonstrates that higher quantity of in-situ precipitation of aluminium hydroxide gel results in lighter coloured supernatant liquid.

Example-7

Treated and clarified BMSW (TC-BMSW-1) was prepared following the procedure of example-5, except the fact that in this experiment $Al^{3+}$ concentration was 0.1% (w/v) instead of 0.3% (w/v).

Example-8

Aluminium sulphate crystals were added to portion of TC-BMSW-1 from example-7, to maintain $Al^{3+}$ concentration 0.1% (w/v), under stirring. The reaction mixture was subsequently neutralized using magnesium hydroxide to facilitate in-situ precipitation of aluminium hydroxide gel. The reaction mixture was centrifuged to obtain clarified supernatant (TC-BMSW-2).

Example-9

Portion of TC-BMSW-2 from example-8 was processed for in-situ precipitation of aluminium hydroxide gel, following the procedure of example-8, to obtain clarified supernatant liquid (TC-BMSW-3). Subsequently, light absorbance of samples of TC-BMSW-1, TC-BMSW-2 and TC-BMSW-3 were measured over 380-800 nm wavelength range. Following table illustrates % reduction in light absorbance of the treated samples vis-à-vis BMSW.

| Sample code | Reduction in light absorbance (%) vis-à-vis BMSW | | | |
| --- | --- | --- | --- | --- |
| | At 400 nm | At 500 nm | At 600 nm | At 700 nm |
| TC-BMSW-1 | 57.73% | 66.96% | 72.05% | 75.98% |
| TC-BMSW-2 | 72.46% | 78.48% | 82.04% | 83.55% |
| TC-BMSW-3 | 84.16% | 89.14% | 92.07% | 93.25% |

Example 7, 8 & 9 teach us that by multiple stages of in-situ formation of aluminium hydroxide gel leads to progressively higher degree of reduction in light absorbance of aqueous phase, across the visible light spectrum (i.e., 400-700 nm). In other words, example 7, 8 & 9 demonstrate that increasing the number of stages of in-situ precipitation of aluminium hydroxide gel result in progressive decolourisation of supernatant liquid.

Example-10

Treated and clarified BMSW (TC-BMSW, $K^\pm$: 2.009% w/v), prepared following the procedure of example-5, was used for production of potassium nitrate, following the general procedure as disclosed in prior art.

130 g magnesium tartrate and 13.3 mL of conc. (36N) sulphuric acid was added into 750 mL of TC-BMSW under stirring. Stirring was continued for 24 h. Final pH of the reaction mixture was 2.61. The reaction mixture was then filtered to obtain K-depleted BMSW ($K^+$: 0.35% w/v, tartaric acid: 1.13% w/v). The residue was further washed with small aliquot of water to obtain 89 g wet potassium bitartrate ($K^+$: 12.99% w/w). Potassium bitartrate thus obtained was subsequently decomposed with nitric acid and magnesium hydroxide to produce potassium nitrate solution. The solution was further treated for removal of residual tartrates and cooled to produce white crystalline potassium nitrate (purity: >99.5%). The K-depleted BMSW was treated with lime and sulphuric acid and filtered to obtain tartrate-free BMSW (tartaric acid: 330 ppm) as filtrate.

Example 10 teaches us that pure potassium nitrate (crystalline, white, purity >99.5%) can be prepared from treated and clarified BMSW.

Example-11

300 mL of tartrate-free BMSW [$Mg^{2+}$: 1.701% (w/v), $Ca^{2+}$: 0.201% (w/v), $SO_4^{2-}$: 5.1% (w/v), tartaric acid: 300 ppm], from example-10, was reacted with 15 g of calcium hydroxide under stirring. Stirring was continued for 3 h. Upon filtration of the resultant slurry, 210 mL filtrate (pH 11.87) was obtained which was neutralised using sulphuric acid and filtered to produce process effluent [$Mg^{2+}$: 0.109% (w/v), $SO_4^{2-}$: 0.41% (w/v), $Ca^{2+}$: 0.231% (w/v); TOC: 5273 ppm, BOD: 1163 ppm, COD: 8586 ppm].

Example 11 teaches us method to generate process effluent with reduced pollutant load.

Example-12

50 g of dried sludge obtained upon treatment of BMSW, following procedure of example-5, was heated to 400° C. with heating rate of 10° C./min. The temperature was maintained for 2 h. The experiment was performed under vacuum (200 mm Hg absolute pressure). The char obtained was soaked in potassium hydroxide solution (40% w/v) for 24 h under stirring.

Subsequently, the slurry was dried and the residue was heated to 600° C. with 10° C./min heating rate. Temperature was maintained for 2 h. The experiment was carried out under $N_2$ atmosphere. BET surface of the solid thus obtained was 523.4 $m^2/g$.

The solid was further treated with 18 N sulphuric acid to leach residual alumina, washed and dried to obtain 13.5 g activated carbon. BET surface of the activated carbon was 994.68 $m^2/g$ and methylene blue dye adsorption capacity was 290.9 mg/g.

Example 12 teaches us method for preparation of activated carbon with high surface area and dye adsorption capacity.

Advantages of the Present Invention

The present invention provides a process for recovery of potassium from BMSW with concomitant improvement of process effluent quality, thereby enabling (i) utilisation of alcohol distillery effluent (BMSW) as an indigenous and sustainable resource for potassium, and (ii) compliance with environmental regulations at lower cost due to >80% reduction of pollutant loading in process effluent.

Main advantages of the present invention may be stated as follows:
i) Compared to the quality of salts obtained through evaporation-incineration methods, potassic salts produced in the present invention are much purer (e.g. purity of $KNO_3$>99.5%).
ii) The core process of BMSW treatment and subsequent potash recovery, as disclosed in the present invention, operate at ambient temperature (20-35° C.) and does not pose difficulties associated with evaporation-incineration methods (viz., fouling, scaling, corrosion etc.).

The invention claimed is:

1. A process for recovery of potassium from bio-methanated spent wash with concomitant improvement of process effluent quality, the process comprising the steps:
(i) treating bio-methanated spent wash (containing about 2% K+ (w/v) with acid under stirring until pH is about 1.5 to form a slurry;
(ii) adding aluminium sulphate solution to the slurry from step (i) under stirring, to maintain Al3+ concentration between 0.05%-0.5% (w/v), followed by adding magnesium hydroxide to the reaction mixture to adjust pH between 5.5-7.5, followed by centrifuging the resulting reaction mixture to obtain acidified bio-methanated spent wash as supernatant liquid and carbon rich sludge;
(iii) reacting the supernatant liquid from step (ii) with about 50% protonated magnesium tartrate, followed by centrifuging the reaction mixture to obtain precipitate of potassium bitartrate and K-depleted bio-methanated spent wash as supernatant liquid;
(iv) treating the supernatant liquid from step (iii) with calcium oxide & sulphuric acid, followed by centrifuging the reaction mixture to obtain precipitate of residual tartrate as calcium tartrate and tartrate-free biomethanated spent wash as supernatant liquid;
(v) treating the supernatant liquid from step (iv) with calcium oxide, followed by centrifuging the reaction mixture to obtain co-precipitate of gypsum & magnesium hydroxide and clarified bio-methanated spent wash as resultant supernatant liquid;
(vi) discharging the resultant supernatant liquid from step (v) as process effluent for subsequent environmental remediation and water recovery;
(vii) calcining the gypsum & magnesium hydroxide obtained from step (v) to calcium sulphate and magnesium oxide;
(viii) reacting the potassium bitartrate from step (iii) with nitric acid and magnesium hydroxide to form potassium nitrate liquor;
(ix) treating the potassium nitrate liquor from step (viii) with calcium hydroxide to remove residual tartrate as calcium tartrate;
(x) cooling or evaporating the tartrate-free potassium nitrate liquor from step (ix) to from potassium nitrate;
(xi) treating precipitated calcium tartrate from step (iv) and step (ix) with sulphuric acid to form tartaric acid for subsequent reuse in step (iii) above;
(xii) pyrolyzing and activating the sludge from step (ii) with potassium hydroxide solution to form alumina rich activated carbon;
(xiii) leaching the alumina rich activated carbon from step (xii) with sulphuric acid to form aluminum sulphate solution and solid residue, followed by recycling the aluminum sulphate solution in step (ii) for in-situ formation of aluminium hydroxide gel;
(xiv) washing and drying the solid residue carbon obtained from step (xiii) to form activated carbon.

2. The process as claimed in claim 1, wherein the acid treatment of bio-methanated spent wash results in 50% reduction of total organic carbon in resultant supernatant liquid from step (i).

3. The process as claimed in claim 1, wherein acid treatment in step (i) is carried out using sulphuric acid, hydrochloric acid, and nitric acid.

4. The process as claimed in claim 1, wherein in-situ formation of aluminium hydroxide gel in acid treated bio-methanated spent wash, in steps (ii) to (v), facilitated partial decolourisation of the liquid phase.

5. The process as claimed in claim 1, wherein potassium nitrate obtained is crystalline, white, and is having purity >99.5%.

6. The process as claimed in claim 1, wherein co-precipitation of gypsum and magnesium hydroxide from the tartrate free bio-methanated spent wash leads to reduction of pollutant load in process effluent.

7. The process as claimed in claim 1, wherein activated carbon is having adsorption capacity of about 290 mg of methylene blue/gm of activated carbon.

* * * * *